Patented June 24, 1930

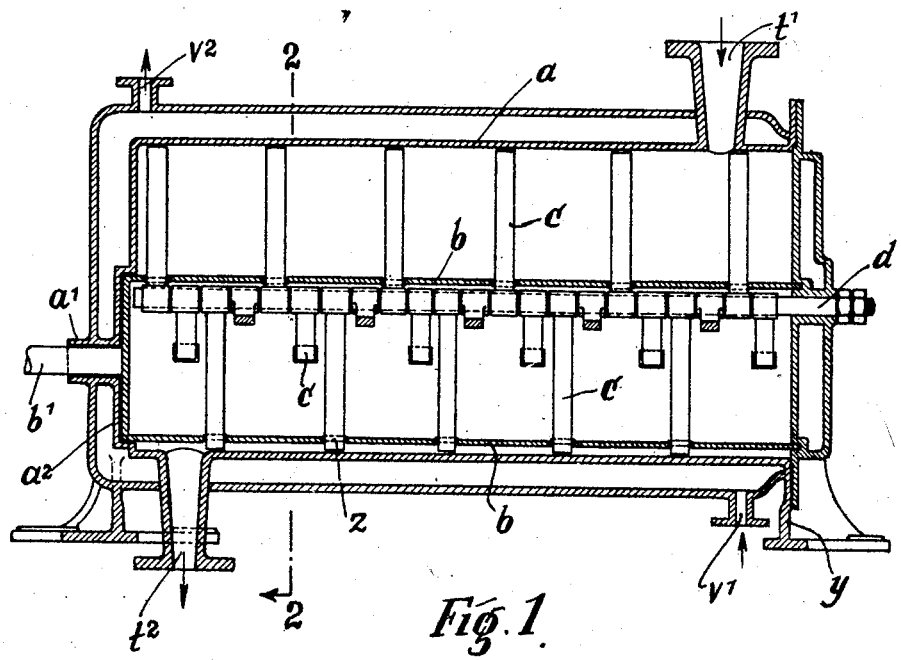
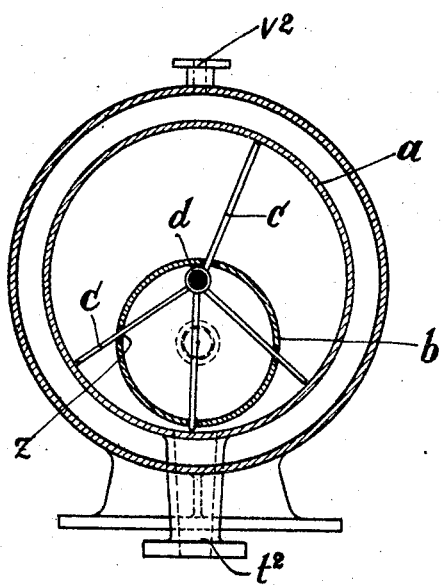

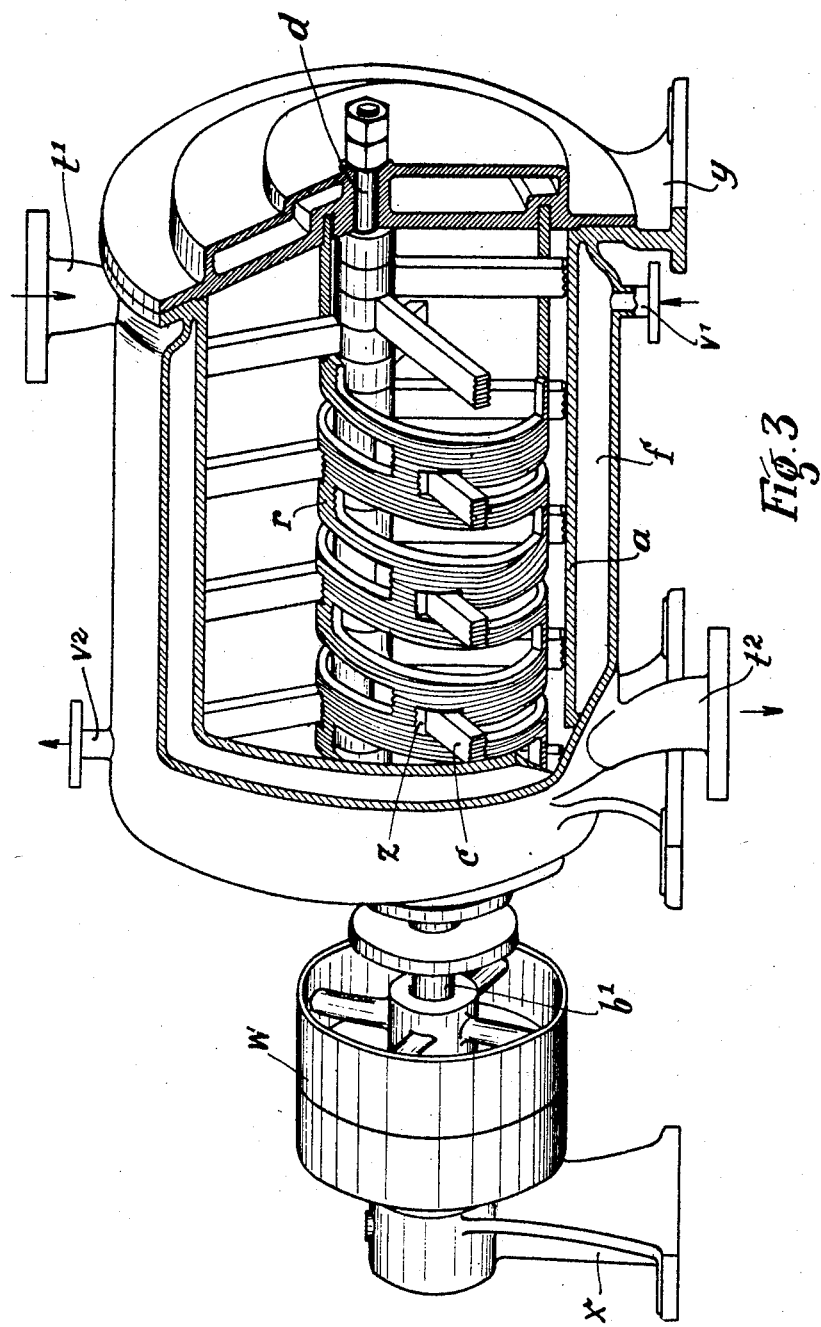

1,767,376

UNITED STATES PATENT OFFICE

ANDREAS KRÄMER, OF BERLIN, GERMANY, ASSIGNOR TO DEBERAG, DEUTSCHE BERATUNGSGESELLSCHAFT FÜR DIE CHEMISCHE UND METALLARUGISCHE INDUSTRIE M. B. H., OF BERLIN, GERMANY, A JOINT-STOCK COMPANY OF GERMANY

DISINTEGRATING, KNEADING, MIXING, AND DRYING MACHINE

Application filed September 27, 1929, Serial No. 395,650, and in Germany October 19, 1928.

My invention relates to improvements in disintegrating, kneading, mixing, and drying machines, and more particularly in machines of the type comprising a cylindrical casing and a stirring mechanism located therein, the said casing and stirring mechanism being rotated relatively to each other for disintegrating, kneading, mixing or drying material. The object of the improvements is to provide a machine of this type in which the material does not stick to the stirring arms and is not formed into coherent lumps. Another object of the improvements is to provide a machine which permits of continuous operation, the material being continuously passed through the machine, or being gradually dried from one end of the machine to the other end. Finally an object of the improvements is to provide a machine which is effective, and which can be manufactured at low cost. With these and other objects in view my invention consists in providing the machine with a stirring mechanism comprising arms which are rotatable relatively to the casing, and which are passed through slots made in a framework preferably in the form of a drum disposed eccentrically of the axis of rotation of the stirring mechanism so that the stirring arms are continuously passed inwardly and outwardly through the framework while rotating relatively to the casing.

For the purpose of explaining the invention an example embodying the same has been shown in the accompanying drawings, in which the same letters of reference have been used in all the views to indicate corresponding parts. In said drawings, Fig. 1 is a sectional elevation showing the drum, Fig. 2 is a sectional elevation taken on the line 2—2 of Fig. 1, and Fig. 3 is a perspective view of the machine, a portion of the casing being broken away to show the inner parts.

In the example shown in the drawings the machine comprises a casing $a$ of cylindrical or similar form supported on feet $y$ and having an intake $t^1$ and an outlet $t^2$ for the material to be treated. In some cases the casing $a$ is provided with a jacket $f$ for circulating a heating or cooling medium therethrough, the said jacket being provided with an intake $v^1$ and an outlet $v^2$. Coaxially of the casing $a$ a rod $d$ is mounted on which arms $c$ are rotatable. Within the casing $a$ and eccentrically thereof a framework $b$ is rotatable, the shaft $b^1$ of which is passed through a sleeve $a^1$ projecting from the end wall $a^2$ of the casing. The shaft $b^1$ is mounted on a bearing block $x$, and it carries a loose and fixed pulley $w$ for rotating the same. In the example shown in the figures the framework $b$ is in the form of a drum formed with radial slots $z$ for the passage of the arms $c$ therethrough.

When rotating the framework or drum $b$ the arms $c$ are rotated around the rod $d$, and they move with their ends across the inner surface of the casing $a$. Upon each rotation of the drum $b$ the arms $c$ are once retracted more or less into the said drum, by reason of the eccentricity of the drum and the rod $d$. By the rotary movement of the arms $c$ the material contained within the casing $a$ is continuously stirred and mixed, and when passing between the drum $b$ and the inner wall of the casing $a$ it is vigorously kneaded. Any material adhering to the arms $c$ is removed therefrom by retracting the arms through the slots $z$ and into the drum or framework $b$. Further, the angular velocity of the arms is different by reason of the eccentricity of the rod $d$ and the drum $b$, and the said circumferential velocity is nearly proportional to the reaction of the material being kneaded on the arms $c$, and for the same reason the bending strain of the arms is more or less constant, the length of the projecting portions of the arms being reduced in the degree as the pressure is increased.

The arms $c$ are disposed helically around the rod $d$, or they are provided at their ends with helically disposed blades or scratching members. Thereby the arms have the function of gradually advancing the material from one end of the casing to the other one. For increasing the said feeding operation the inner surface of the casing $a$, the outer surfaces of the arms c or the outer surface of the drum b may be provided with helical or spiral grooves r, as is shown in Fig. 3.

If the machine is used for disintegrating or tearing certain materials, the outer surface of the drum b and the inner surface of the drum a may be provided with teeth, knives and the like. If desired the said teeth or knives are distributed helically around the surfaces, in order to support the advancing operation.

The casing a or the drum b may also be in the form of a single or double cone or obtuse cone, so that the kneading or disintegrating action proceeds from one end of the casing to the other one, or from the middle of the casing to the ends thereof or vice versa.

In the example shown in the figures the frame b is in the form of a drum having a substantially solid wall. But I wish it to be understood that I do not limit myself to this feature and that according to the work to be performed an open framework may be used. Further, provision may be made for rotating the drum in one or the other direction, and for carrying out the work at elevated or reduced temperature or pressure.

I claim:

1. In apparatus of the class described, the combination with a cylindrical casing, of a plurality of beater arms rotatable about an axis substantially coincident with the axis of the casing and extending radially of the casing so that the ends of said arms move in close proximity to the cylindrical casing wall, and a framework in which the beater arms are slidably supported, said framework being rotatably mounted within the casing about an axis eccentric to the casing axis, whereby rotation of the framework effects rotation of the beater arms at speeds varying in accordance with the positions of the arms with respect to the plane containing the axis of rotation of the arms and the axis of rotation of the framework.

2. In apparatus of the class described, the combination with a cylindrical casing, of a plurality of beater arms rotatable about an axis substantially coincident with the axis of the casing and extending radially of the casing so that the ends of said arms move in close proximity to the cylindrical casing wall, and a framework in which the beater arms are slidably supported, said framework being rotatably mounted within the casing about an axis eccentric to the casing axis and beneath the latter, whereby rotation of the framework effects rotation of the beater arms at speeds varying in accordance with the positions of the arms with respect to the plane containing the axis of rotation of the arms and the axis of rotation of the framework.

3. In apparatus of the class described, the combination with a cylindrical casing, of a plurality of beater arms rotatable about an axis substantially coincident with the axis of the casing and extending radially of the casing so that the ends of said arms move in close proximity to the cylindrical casing wall, said beater arms being disposed substantially helically about their axis of rotation, and a framework in which the beater arms are slidably supported, said framework being rotatably mounted within the casing about an axis eccentric to the casing axis, whereby rotation of the framework effects rotation of the beater arms at speeds varying in accordance with the positions of the arms with respect to the plane containing the axis of rotation of the arms and the axis of rotation of the framework.

In testimony whereof I hereunto affix my signature.

ANDREAS KRÄMER.